June 22, 1954  A. HAGE  2,681,678

NUT AND RESILIENT WASHER ASSEMBLY

Filed June 26, 1950

INVENTOR.
Albert Hage
BY
ATTORNEY

Patented June 22, 1954

2,681,678

UNITED STATES PATENT OFFICE 2,681,678

NUT AND RESILIENT WASHER ASSEMBLY

Albert Hage, Toledo, Ohio

Application June 26, 1950, Serial No. 170,380

2 Claims. (Cl. 151—37)

This invention relates to lock nuts, but more particularly to a nut and resilient washer assembly, and an object is to produce a new and improved nut and washer assembly in which the washer can flex in a tongue-like manner when the nut is tightened against the work thereby securely to retain the nut in its tightened position, but when the nut is unscrewed, the washer flexes back to its normal position, thereby enabling the assembly to be used repeatedly.

Another object is to produce a nut and washer assembly of the above character in which the washer is provided with rows of apertures separating the washer body into internal and external tongues, thereby substantially augmenting the resilience and flexibility and extending the useful life of the assembly.

A further object is to produce an assembly of the above character having means for impinging against the work for resisting unscrewing of the nut.

Other objects and advantages will hereinafter appear, and for purposes of illustration but not of limitation, embodiments of the invention are shown in the accompanying drawings, in which Figure 1 is a side elevation of the nut and washer assembly, some parts being broken away for purposes of clarity;

Figure 1:
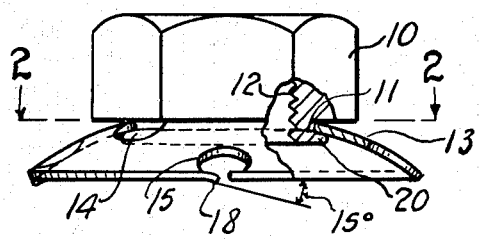
Figure 2:
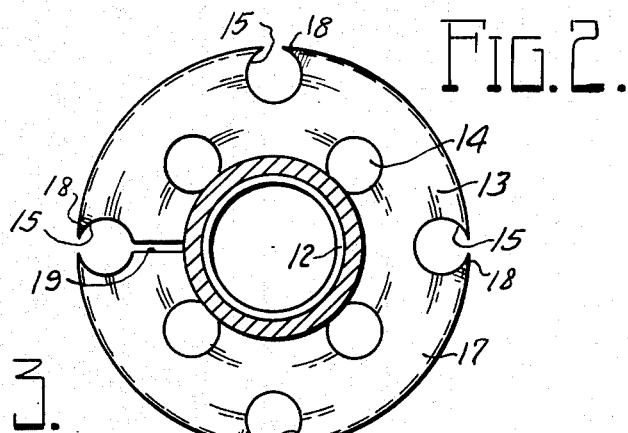
Figure 2 is a sectional view of the assembly on the line 2—2 of Figure 1.

The illustrated embodiment of the invention comprises a nut body 10 which has wrench-receiving flats on the side walls and formed with a reduced axial extension 11 which projects beyond the flat bottom end of the nut body. Screw threads 12 extend continuously through the nut body and extension. The outer wall of the extension 11 is cylindrical and fitting thereagainst is a spring metal concavo-convex washer 13 which is of dome-like form and extends downwardly a substantial distance beyond the end of the extension 11 and also laterally beyond the side walls of the nut body. Formed in the spring metal washer 13 is an inner annular row of holes 14 which may intersect and interrupt the continuous inner edge or periphery of the washer.

Figure 3:
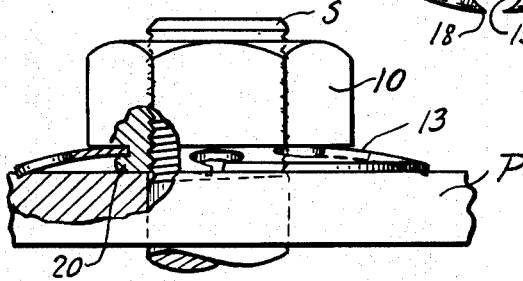
Figure 3 is a side elevation partly in section, showing the nut assembly screwed against a panel or work piece.

An outer annular row of holes 15 are also formed in the washer and as shown, these intersect the outer edge of the washer to provide a very narrow gap between the adjacent pointed ends. Thus the outer row of holes 15 form, in effect, a series of tongues 17 which are independently flexable relative to each other and afford substantial resistance. As shown, the inner and outer rows of holes are tangent to a common circle and are arranged in staggered relation with respect to each other. The arrangement is such that not only is there a series of tongues 17 but, in effect, there is a series of inner tongues defined between the adjacent holes of the inner row. This arrangement affords excellent resilience and flexibility to the unit, enables quite substantial flexing without washer being forced beyond its yield point as might obtain if the washer were not so constructed when the nut is screwed tightly upon the screw or bolt S against the work piece or panel P, as illustrated in Figure 3.

In order effectively to resist unscrewing of the nut and washer assembly, one of the pointed ends or prongs 18 of the tongue 17 is turned downwardly to an angle of approximately 15°. The prong 18 impinges against the surface of the panel P and resists any tendency of the nut to become unscrewed.

As shown in Figure 1, the washer 13 is formed with a radial slit 19 thereby enabling the washer to be slipped over an outwardly extending flange or shoulder 20 on the outer end of the extension 11. Thus the flange 20 is formed on the nut unit and thereafter the washer is forced over the flange and this action is rendered possible due to the radial slitting of the washer.

Under some conditions, it may be desirable to omit the flange 20 thereby using a washer which is unslit. In this instance, the washer is slipped over the extension 11 and then the outer end of the extension is peened over to provide the flange 21 as shown on Figure 4, thus retaining the washer to the nut body 10a.

Figure 4:
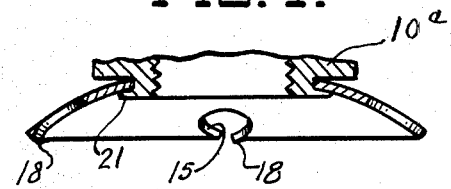
Figure 4 is a fragmentary sectional view showing an alternate means of securing the washer in place.
Figure 5:
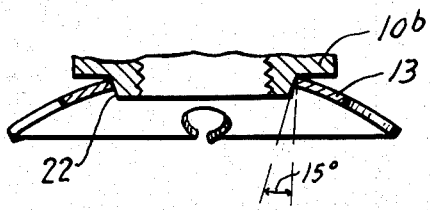
Figure 5 is a view similar to Figure 4, but showing a further means of attaching the washer to the nut body extension.

In Figure 5, the nut body 10b is provided with an axial extension, the outer walls of which taper inwardly approximately 15°. In this instance, a washer similar to that used in Figure 4 is slipped or forced over the extension and the increase in diameter of the extension cooperates with the edge of the washer hole to frictionally bind the washer in place. In this instance, the central hole in the washer 13 should be of sufficient diameter to fit relatively snugly after the washer is forced upwardly substantially against the flat under face of the nut body.

What I claim is:

1. A nut and washer assembly comprising a nut body having an internal screw thread, an axial extension on the work end of the nut of less diameter than the body and having an external annular surface, the work end of the nut body being flat and extending transversely to the axis of the body and the extension, an outwardly cupped concavo-convex washer of dome-like form fitting said extension abutting said work end and projecting downwardly beyond the extension and laterally beyond the nut body the concavo-convex configuration of the washer extending throughout the radial extent of the washer, said extension having means whereby the nut and washer are maintained together in a manner to permit relative rotation, said extension also serving as a stop to prevent the washer from being distorted beyond its yield point, said washer having inner and outer rows of substantially circular holes therethrough arranged in staggered relation whereby the material between the holes affords in effect inner and outer independently flexible tongues adapted to resiliently supplement each other when the nut is screwed tightly against the work, the holes in the inner row being angularly spaced substantially midway between the holes in the outer row, the inner and outer rows of holes severing peripheral edge portions of the washer to provide relatively narrow gaps betweens adjacent pointed ends, the material between the outer periphery of the washer and one side of each of the holes in the outer row being bent downwardly to provide a prong for impinging against the work, and the holes of the inner and outer rows being substantially tangent to a common circle.

2. A nut and washer assembly comprising a nut body having an internal screw thread, an axial extension on the work end of the nut of less diameter than the body and having an external annular surface, the work end of the nut body being flat and extending transversely to the axis of the body and the extension, an outwardly cupped concavo-convex washer of dome-like form fitting said extension abutting said work end and projecting downwardly beyond the extension and laterally beyond the nut body the concavo-convex configuration of the washer extending throughout the radial extent of the washer, said extension having means whereby the nut and washer are maintained together in a manner to permit relative rotation, said extension also serving as a stop to prevent the washer from being distorted beyond its yield point, said washer having inner and outer rows of substantially circular holes therethrough arranged in staggered relation whereby the material between the holes affords in effect inner and outer independently flexible tongues adapted to resiliently supplement each other when the nut is screwed tightly against the work, the holes in the inner row being angularly spaced substantially midway between the holes in the outer row, the inner and outer rows of holes severing peripheral edge portions of the washer to provide relatively narrow gaps between adjacent pointed ends, and the holes of the inner and outer rows being substantially tangent to a common circle.

References Cited in the file of this patent

UNITED STATES PATENTS

| Number | Name | Date |
|---|---|---|
| Re. 19,492 | Winchester et al. | Mar. 5, 1935 |
| 331,169 | Thomas | Nov. 24, 1885 |
| 404,284 | Johnson | May 28, 1889 |
| 1,339,418 | Poehland | May 11, 1920 |
| 1,391,378 | Gaston | Sept. 20, 1921 |
| 2,226,491 | Gustafson | Dec. 24, 1940 |
| 2,284,081 | Beggs | May 26, 1942 |
| 2,380,994 | Pummill | Aug. 7, 1945 |

FOREIGN PATENTS

| Number | Country | Date |
|---|---|---|
| 686,295 | France | Apr. 8, 1930 |
| 721,806 | France | Mar. 8, 1932 |
| 270,975 | Germany | May 17, 1928 |